June 4, 1929.  E. ROTHER  1,715,866
ASYNCHRONOUS MACHINE WITH CONDENSER
Filed Aug. 14, 1924  2 Sheets-Sheet 1
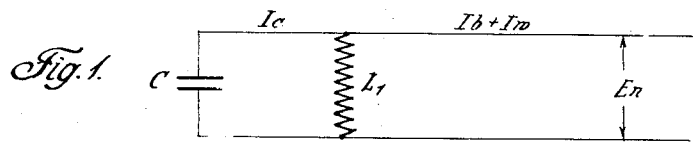
Fig. 1.
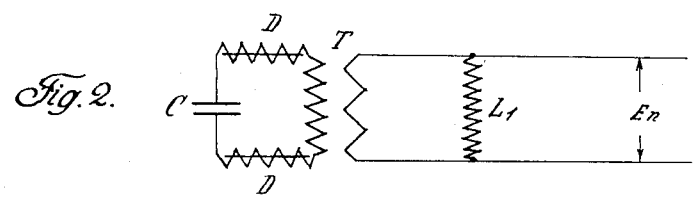
Fig. 2.
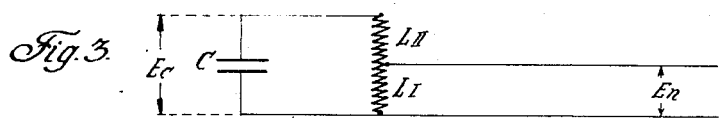
Fig. 3.
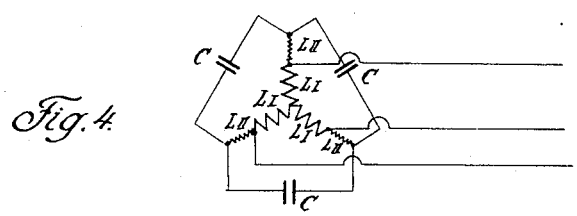
Fig. 4.
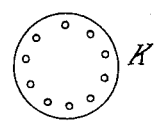
Fig. 5.
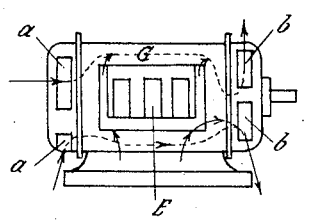
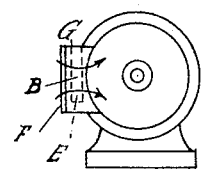
Inventor
Erich Rother
by Knight Bros
Attorneys June 4, 1929.  E. ROTHER  1,715,866

ASYNCHRONOUS MACHINE WITH CONDENSER

Filed Aug. 14, 1924   2 Sheets-Sheet 2

Inventor
Erich Rother
by Knight Bro
attorney

Patented June 4, 1929.

1,715,866

UNITED STATES PATENT OFFICE.

ERICH ROTHER, OF KIEL, GERMANY, ASSIGNOR TO THE FIRM NEUFELDT & KUHNKE BETRIEBSGESELLSCHAFT M. B. H., OF KIEL, GERMANY.

ASYNCHRONOUS MACHINE WITH CONDENSERS.

Application filed August 14, 1924, Serial No. 732,130, and in Germany August 17, 1923.

My invention relates to the known arrangement of condensers in an asynchronous machine for producing the magnetization current, and especially to an also known construction of such machine, in which the condenser is connected to the secondary winding of a transformer, the primary winding of which is arranged in parallel to the working winding of the machine.

According to the invention the working winding of the machine is used directly as primary winding of this transformer, and the secondary winding is placed in the same slots with the working winding. This arrangement has the advantage of doing away with a separate transformer. In its exterior the machine differs from the asynchronous machines heretofore used only in the addition of the condenser.

In the accompanying drawings—

Figs. 1 and 2 constitute explanatory diagrams showing a capacity in parallel with an inductive impedance for power-factor correction in a single phase circuit;

Fig. 3 shows the principle of my invention applied to a single phase induction machine;

Figs. 4 and 5 show the application of my invention to a three phase induction motor, Fig. 4 showing the diagrammatic connections in this motor, and Fig. 5 the expedient arrangement of such a machine in connection with the compensating condenser battery.

Figure 6:
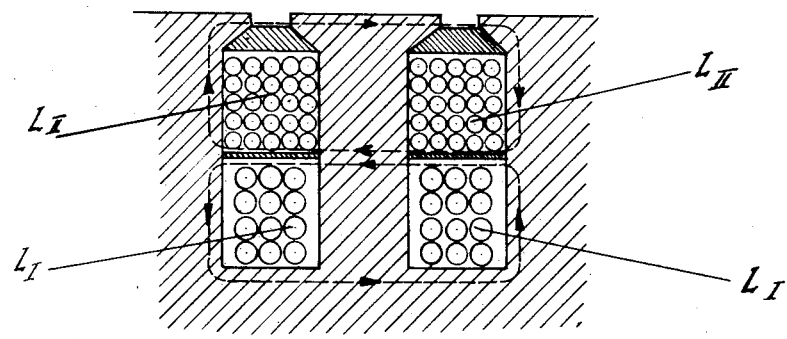
Fig. 6 shows the manner in which the self-induction according to Fig. 4 may be arranged in the slots of the motor.

In Fig. 1 C is a condenser. $L_I$ is an inductive resistance. $E_n$ is the voltage applied to the inductive resistance. $I_w$ is the working current, and $I_b$ is the lagging magnetization current. $I_c$ is the leading charging-current of the capacity C. In a connection according to Fig. 1 the current $I_b$ can be made as strong as the current $I_c$, in which case the magnetization current for the inductive resistance $L_I$ is applied by the condenser C. In this known connection according to Fig. 1 the condenser voltage must be as large as the voltage of the system $E_n$, the result of which is that the condenser must be very large at low terminal voltage. Another disadvantage of such a connection is that the intensity of higher harmonics of the voltage wave of the system is increased by the capacity, when switched in, causing a violent rush of current. These disadvantages are avoided in the known connection according to Fig. 2. In this figure T is a transformer. D are choking coils, C is a capacity, $L_I$ is an inductive resistance, and $E_n$ is the voltage of the system. The transformer T transforms the voltage of the system into the value appropriate for the capacity C. The choking coil D suppresses the harmonics of the voltage wave of the system thus damping the rush of the current. The manufacturing of the connection according to Fig. 2 is expensive because of the secondary apparatus of the machine, such as the transformer and the choking coils which must be supplied individually in case it is required to supply each individual inductive resistance, for instance for each asynchronous motor of a system, with magnetization current.

Fig. 3 shows a connection, in which according to the invention the special transformer T is made superfluous. This diagram relates to a single-phase motor, the same as the diagrams shown in Figs. 1 and 2. The primary single-phase winding in the stator of the motor is divided into two parts $L_I$ and $L_{II}$. These two parts are disposed in the slots of the stator, that is, they are magnetically interlinked and connected in series. The voltage of the system is applied to the part $L_I$, the capacity C is connected to the free ends of the two windings and thus the higher voltage $E_c$ is applied to it. The short-circuit rotor K of the machine is diagrammatically shown under the stator-winding $L_I$. The stator working winding thus serves as primary winding of the transformer, the secondary winding being connected with the capacity.

It is supposed in this device that the voltage $E_n$ of the system is too low for a condenser battery. Of course it may also happen that the voltage of the system is higher than suitable for the condenser. In this case the connections of the system and of the condenser must be reversed i. e. the condenser is connected to $L_I$ and the line to $L_I L_{II}$.

Fig. 4 shows the diagram of the connections of a three-phase motor. K is a short-circuit rotor with squirrel-cage winding. The three machine-phases $L_I$ have star-connection, the condensers C have delta-connection. Of course the advantages inherent to the present invention can be realized also by other suitable connection.

Figure 7:
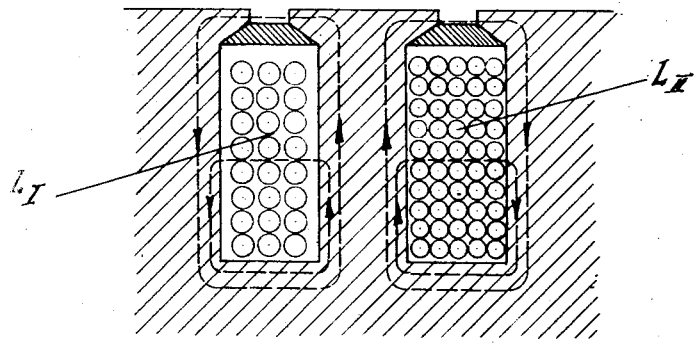
Fig. 7 shows a somewhat modified form of the arrangement shown in Fig. 6.

It is useful to leave the condensers permanently connected to the machine windings in order to switch always simultaneously the capacities and the inductive resistances when the motor is connected in circuit. The parts of the winding connected in series with the condensers thus have the effect of protective choking-coils. Experience has shown that it is not always advisable to place the working winding and the winding connected to the condensers in the same slots, because thus the magnetic coupling of the two windings becomes very close. In this case it is possible that the rushing current, on closing the circuit, rises to an unpermissible value. The rush of the current on closing the circuit can be limited by increasing the stray flux of the transformer, formed by the two windings. By this expedient the magnetic coupling between the working winding and the winding connected to the condensers becomes looser, and the choking effect of the working winding is increased. In order to increase the stray flux the working winding and the winding connected to the condensers are placed in separate slots. Figs. 6 and 7 show this expedient of increasing the stray flux. In Fig. 6 the working winding $L_I$ and the transformer winding $L_{II}$ are disposed in the same slots. The stray flux, indicated by a broken line, encircling windings $L_{II}$ has to pass an air path at least as wide as two slots. In Fig. 7 the working winding and the secondary winding are placed in separate slots, the stray flux as shown by the broken line around $L_{III}$, traversing only one air gap. Therefore the flux density is much greater than in the modification, Fig. 6, where the two windings are placed in the same slots.

The stray flux of the primary winding can also be increased according to the invention by placing one of the two windings in the stator and the other in the rotor, for instance by connecting the rotor to the system, leaving the secondary winding in the stator. Between the primary winding in the rotor and the secondary winding in the stator a stray-flux develops, limited in its strength only by the size of the air gap. This flux coefficient is the same for all machines of a given type and is usually termed "total coefficient of stray". This arrangement is especially useful for big asynchronous machines running relatively slowly and having only three slots for each phase, the placing of the windings in separate slots being impossible.

It is known that the cooling of condensers for power circuits is often very difficult, and that oil cooling often is not satisfactory. To render as sufficient as possible the cooling of the condensers, it is advisable to mechanically mount the condensers as close to the machine as possible and to use the cooling air current of the machine for the cooling of the condensers. The losses in the condensers being always much lower than the losses in the machine, the cooling of the condensers is easily accomplished in this way without decreasing the cooling of the machine.

Fig. 5 shows such an air-cooling arrangement. The motor shown in the drawing is a so-called enclosed ventilated motor, that is a machine, in which the cooling air is sucked in through the openings $a$ of a bearing bracket by a ventilator arranged on the shaft, the hot air being exhausted through the openings $b$ of the other bearing bracket.

The stator casing has an extension G connected with the interior. In this extension is disposed an iron sheet metal tank B, containing the condenser cells E submerged in oil. Owing to the ventilating pressure in the machine being below atmospheric, a second fresh air current enters into it by way of the extension casing G thru a cover F made of perforated sheet metal, this fresh air current cooling the tank.

The tank with the condensers if more convenient of course may be placed in any other part of the machine, for instance in the lower part. Essential for the cooling is however that the condenser is cooled with fresh air, not yet used for the cooling of other parts of the machine.

Having thus described my invention, what I claim as new, and desire to secure by Letters Patent is:—

1. In an asynchronous machine a multiphase slotted rotor element, a slotted stator element, a multiphase working winding disposed within the slots of one of said elements, a multiphase alternating current source connected to said winding, another multiphase winding disposed co-phasially with the working winding within the slots of the same element containing the working winding, and a condenser having its terminals connected in circuit with both of said windings.

2. In an asynchronous machine a multiphase slotted stator, a rotor, a multiphase working winding disposed within the slots of said stator, a multiphase alternating current source connected to said working winding, another multiphase winding disposed co-phasially with the working winding within the slots of said stator winding and connected at one end to said working winding and a condenser having its terminals connected in circuit with both of said windings.

3. In a multiphase asynchronous machine a slotted stator, a rotor, a multiphase working winding disposed within the slots of said stator, a multiphase alternating current source connected to said working winding, another multiphase winding disposed co-phasially with the working winding within the stator slots and having one end of its several coils connected to said working winding, and condensers connected between the free ends of said other winding.

4. In a three phase asynchronous machine a slotted stator, a rotor, a three phase star-connected working winding disposed within the slots of said stator, a three phase alternating current source connected to said working winding, another three phase winding, disposed co-phasially with the working winding within said stator slots and being connected to the free ends of said working winding, and condensers connected between the free ends of said other winding.

5. In an asynchronous machine a slotted stator, a rotor, a working winding disposed within the slots of said stator, an alternating current source connected to said working winding, another winding disposed co-phasially with the working winding within the slots of said stator winding and connected at one end to said working windings and a condenser having its terminals connected with both of said windings, said condenser being disposed within said stator.

In testimony whereof I affix my signature.

ERICH ROTHER.